US009955381B2

(12) United States Patent
Koskinen et al.

(10) Patent No.: US 9,955,381 B2
(45) Date of Patent: Apr. 24, 2018

(54) STEERING TRAFFIC BETWEEN CELLULAR NETWORKS AND WLAN NETWORKS

(71) Applicant: Nokia Technologies Oy, Espoo (FI)

(72) Inventors: Jussi-Pekka Koskinen, Oulu (FI); Ilkka Antero Keskitalo, Oulu (FI); Sami Kekki, Helsinki (FI); Jari Mutikainen, Lepsama (FI)

(73) Assignee: Nokia Technologies Oy, Espoo (FI)

( * ) Notice: Subject to any disclaimer, the term of this patent is extended or adjusted under 35 U.S.C. 154(b) by 2 days.

(21) Appl. No.: 14/911,302

(22) PCT Filed: Aug. 20, 2013

(86) PCT No.: PCT/US2013/055851
§ 371 (c)(1),
(2) Date: Feb. 10, 2016

(87) PCT Pub. No.: WO2015/026334
PCT Pub. Date: Feb. 26, 2015

(65) Prior Publication Data
US 2016/0205592 A1 Jul. 14, 2016

(51) Int. Cl.
*H04W 28/08* (2009.01)
*H04W 48/12* (2009.01)
*H04W 88/06* (2009.01)

(52) U.S. Cl.
CPC ........... *H04W 28/08* (2013.01); *H04W 48/12* (2013.01); *H04W 88/06* (2013.01)

(58) Field of Classification Search
None
See application file for complete search history.

(56) References Cited

U.S. PATENT DOCUMENTS

2010/0323698 A1 12/2010 Rune et al.
2011/0044253 A1* 2/2011 Zisimopoulos ....... H04W 48/16
370/328

(Continued)

FOREIGN PATENT DOCUMENTS

WO 2012149954 A1 11/2012

OTHER PUBLICATIONS

International Search Report and Written Opinion received for corresponding Patent Cooperation Treaty Application No. PCT/US2013/055851, dated May 15, 2014, 14 pages.
ETRI: "Analysis on Requirement Fulfilment of Network Selection Solutions", 3GPP Draft; R2-132485 Analysis on Requirement Fulfilment of Network Selection Solutions, 3rd Generation Partnership Project (3GPP), Mobile Competence Centre; Aug. 9, 2013, XP050718189, Retrieved from Internet http://www.3gpp.org/ftp/tsg_ran/WG2_RL2/TSGR2_83/Docs/ [retrieved on Aug. 9, 2013].

(Continued)

*Primary Examiner* — Andrew Lai
*Assistant Examiner* — Jamaal Henson
(74) *Attorney, Agent, or Firm* — Mintz Levin Cohn Ferros Glovsky and Popeo, P.C.

(57) ABSTRACT

Methods and apparatus, including computer program products, are provided for steering traffic. In one aspect there is provided a method. The method may include receiving, at a user equipment, a message provided by a base station serving a radio access network, wherein the message includes an indication representative of a preference by the radio access network for traffic associated with at least one of an application, a destination domain, a service, and a traffic type; and determining whether to steer, based on the preference, the traffic to at least one of the radio access network or a wireless local area network served by a wireless local area network access point. Related apparatus, systems, methods, and articles are also described.

19 Claims, 5 Drawing Sheets

(56) References Cited

U.S. PATENT DOCUMENTS

| | | | | |
|---|---|---|---|---|
| 2014/0003239 A1* | 1/2014 | Etemad | ............... | H04W 28/08 370/235 |
| 2014/0022904 A1* | 1/2014 | Ahmad | ............ | H04W 28/0289 370/235 |
| 2014/0082697 A1* | 3/2014 | Watfa | ............... | H04W 76/025 726/3 |
| 2014/0133294 A1* | 5/2014 | Horn | ............... | H04W 28/0247 370/230 |

OTHER PUBLICATIONS

NSN et al: "(Compromising) WLAN IW Solution for UEs with and withour ANDSF", 3GPP Draft; R2-132327 (WLAN-3GPP Solution), 3rd Generation Partnership Project (3GPP), Mobile Competence Centre; vol. RAN WG2, no. Barcelona, Spain; 20130819-20130823; Aug. 9, 2013, XP050718106, Retrieved from Internet URL: http//www.3gpp.org/ftp/tsg_ranWG2_RL2/TSGR2_83/Docs/ [retrieved on Aug. 9, 2013].

3GPP, "Technical Specification Group Core Network and Terminals; Access Network Discovery and Selection Function (ANDSF) Management Object (MO) (Release 11)," 3rd Generation Partnership Project, 3GPP TS 24.312 V11.6.0, Mar. 2013.

3GPP, "Technical Specification Group Radio Access Network; Evolved Universal Terrestrial Radio Access (E-UTRA); Multiplexing and channel coding (Release 11)," 3rd Generation Partnership Project, 3GPP TS 36.212 V11.3.0, Jun. 2013.

3GPP, "Technical Specification Group Radio Access Network; Evolved Universal Terrestrial Radio Access (E-UTRA); Physical Channels and Modulation (Release 11)," 3rd Generation Partnership Project, 3GPP TS 36.211 V11.3.0, Jun. 2013.

3GPP, "Technical Specification Group Radio Access Network; Evolved Universal Terrestrial Radio Access (E-UTRA); Physical layer procedures (Release 11)," 3rd Generation Partnership Project, 3GPP TS 36.213 V11.3.0, Jun. 2013.

3GPP, "Technical Specification Group Radio Access Network; Evolved Universal Terrestrial Radio Access (E-UTRA); Physical layer; Measurements (Release 11)," 3rd Generation Partnership Project, 3GPP TS 36.214 V11.1.0, Dec. 2012.

3GPP, "Technical Specification Group Radio Access Newtork; Evolved Universal Terrestrial Radio Access (E-UTRA); LTE physical layer; General description (Release 11)," 3rd Generation Partnership Project, 3GPP TS 36.201 V11.1.0, Dec. 2012.

* cited by examiner

FIG. 1

Bitmap on the broadcast channel:

Configuration information (i.e. the key for deciphering the bit map):

Bit position
    0        interactive real-time
    1        streaming video
    2        internet
    4        App.ID: Skype        220
    5        destination domain: youtube.com
    6        n/a
    7        n/a

STEERING TRAFFIC BETWEEN CELLULAR NETWORKS AND WLAN NETWORKS

RELATED APPLICATION

This application was originally filed as Patent Cooperation Treaty Application No. PCT/US2013/055851 filed Aug. 20, 2013.

FIELD

The subject matter described herein relates to wireless communications.

BACKGROUND

Access Network Discovery and Selection Function (ANDSF) provides a way for a mobile network operator to use policy-based steering of traffic between cellular access networks, such as Third Generation Partnership Project (3GPP)-type access networks, and non-3GPP-type access networks (for example, wireless local area networks). ANDSF, however, has some characteristics that can reduce its applicability in some traffic steering scenarios. Specifically, ANDSF is an optional feature in the 3GPP standards, so the ANDSF may not be available at some devices. Moreover, ANDSF does not specify how devices evaluate ANDSF policies. Furthermore, ANDSF allows its policies to be overruled by local device preferences (for example, end-user preferences and local operating environment parameters).

SUMMARY

Methods and apparatus, including computer program products, are provided for steering traffic. In one aspect there is provided a method. The method may include receiving, at a user equipment, a message provided by a base station serving a radio access network, wherein the message includes an indication representative of a preference by the radio access network for traffic associated with at least one of an application, a destination domain, a service, and a traffic type; and determining whether to steer, based on the preference, the traffic to at least one of the radio access network or a wireless local area network served by a wireless local area network access point.

In some variations, one or more of the features disclosed herein including the following features can optionally be included in any feasible combination. The message may be provided by at least one of a broadcast by the base station or a signaling channel. The indication may identify a specific type of traffic preferred by the radio access network, wherein the specific type may include at least one of the application, the destination domain, the service, and the traffic type. The indication may include a threshold defining when the traffic is to be steered to at least one of the radio access network and the wireless local area network. The indication may include a bit-mapped indicator decoded using a key to identify a specific type of traffic preferred by the radio access network, wherein the specific type may include at least one of the application, the destination domain, the service, and the traffic type. The bit-mapped indicator may be received via at least one of non-access stratum signaling, open mobile alliance device management, and short message service messaging. The indication may be valid only in the radio access network. The indication may be valid only in at least one of a tracking area and a public land mobile network. The user equipment may apply a policy determined from the preference before applying other policy local to the user equipment, wherein the other policy includes at least one of a user preference and an access network discovery and selection function policy. The content of the received indication may change as network conditions change. When another indication representative of another preference is received from the signaling channel, the user equipment may apply the indication received from the broadcasted message. The indication may be received from the wireless local area network access point. The preference may include an allowance.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF THE DRAWINGS

In the drawings.

Like labels are used to refer to same or similar items in the drawings.

DETAILED DESCRIPTION

In some example embodiments, the subject matter disclosed herein relates to load balancing between access networks including cellular networks and non-cellular networks, such as wireless local area networks. For example, the network may send via a broadcast or other forms of signaling an indication to one or more user equipment. This indication may provide information representative of which services, applications, destination domains, and/or traffic types are allowed and/or preferred by the network in a given cellular access network or a given WLAN access network. This indication may, in some example embodiments, allow the network to control user equipment network access in a more dynamic way, when compared to more static policy techniques, such an Access Network Discovery and Selection Function (ANDSF) and the like. The indication may be considered dynamic in the sense that the network can readily change the contents of the indication to change how traffic is steered in the network. For example, if a cell becomes congested, the indication sent to the user equipment may indicate a preference/allowance for only "voice traffic," so other types of traffic can be carried by a non-cellular, WLAN-type network—thus reducing the traffic carried by the congested cell.

Figure 1:
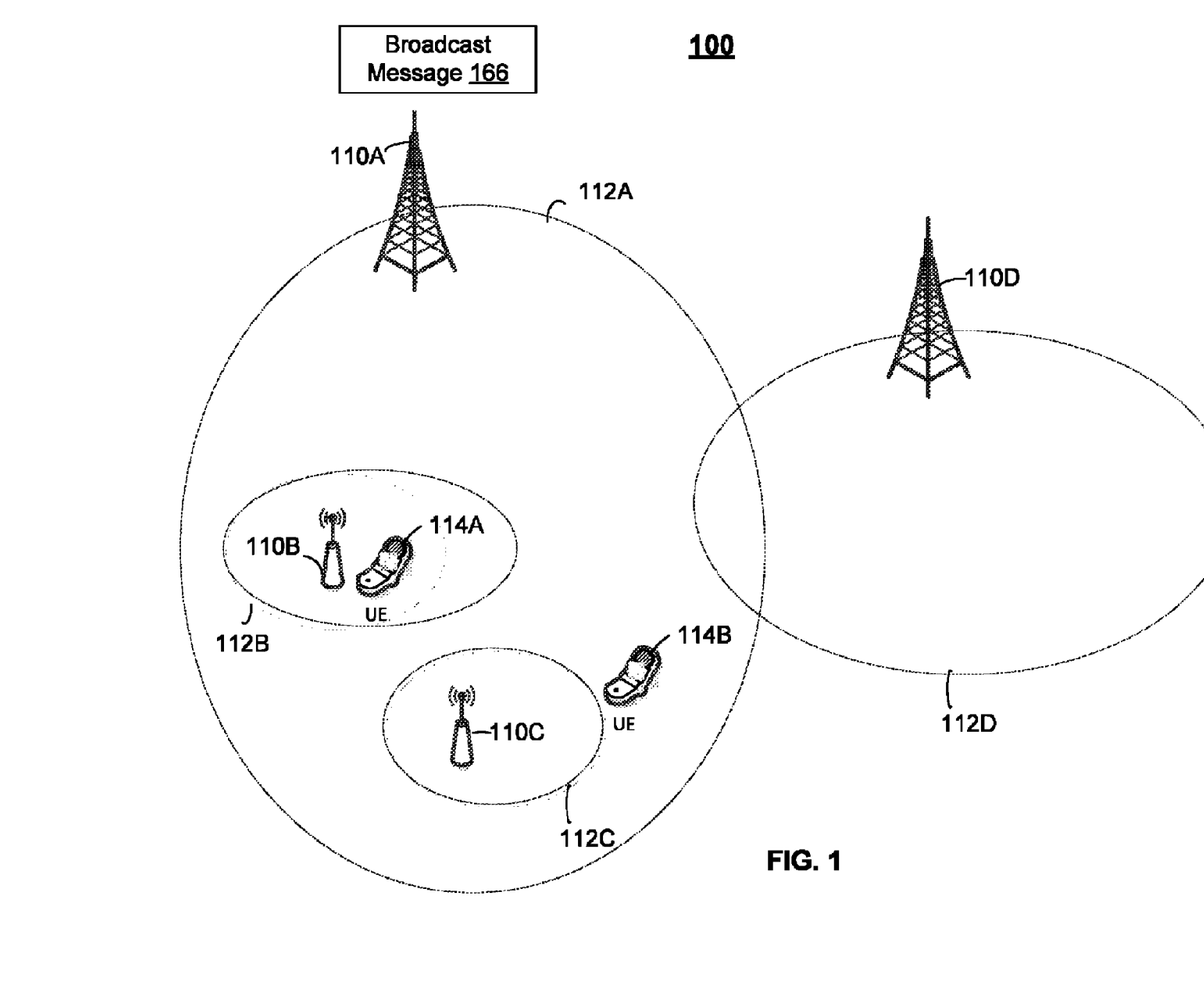
FIG. 1 depicts an example of a system for traffic steering, in accordance with some exemplary embodiments.

FIG. 1 depicts an example system 100 including one or more cells 112A-D (also referred to herein as coverage areas) served by corresponding wireless access points, such as for example base stations 110A and 110D and wireless local area network (WLAN) access points 110B-C. System 100 also includes wireless devices, such as for example user equipment 114A-B.

In the example depicted at FIG. 1, a network may control access to a cellular access network and/or a non-cellular access network (for example, a WLAN) by for example sending, in some example embodiments, a broadcast message 166. Broadcast message 166 may, in some example embodiments, be broadcast to one or more user equipment 114A-B and include an indication of whether certain services, certain applications, certain destination domains, and/or certain traffic types are allowed and/or preferred in an access network.

Although the previous example describes the broadcast message 166 as indicating whether certain services, certain applications, certain destination domains, and/or certain traffic types are allowed and/or preferred in an access network/cell 112A, the broadcast message 166 may indicate these allowances and/or preferences for other access networks/cells as well. Moreover, other base stations and/or WLAN access points 110B-C may send broadcast message 166 as well.

When one or more user equipment, such as for example user equipment 114A, receive broadcast message 166, user equipment may, in some example embodiments, apply the received indication to determine whether to steer traffic toward access point 110B (and the corresponding coverage area of WLAN 112B) instead of cellular cell 112A including base station 110A. Moreover, a user equipment may also apply, in some example embodiments, the broadcast indication before applying other more static polices, such as for example ANDSF. For example, if the received broadcast message 166 indicates a preference for keeping a certain application or traffic type on a cellular access network (for example, cell 112A), user equipment 114A may keep that application or traffic on base station 110A/cell 112A rather than steer that application/traffic to a non-cellular access point, such as for example WLAN access point 110B/ WLAN 112B.

In addition, user equipment 114A may, in some example embodiments, be configured to apply the rule (or policy) represented by the broadcast indication 166 before, or instead of, other more static policies, such as for example an ANDSF policy or other more static local policy. Returning to the previous example, user equipment 114A may maintain a certain application or traffic type on the cellular access network based on the received indication 166 and inhibit, delay, and/or ignore an ANDSF policy regarding routing such traffic to WLAN access point 110B. Moreover, the user equipment 114A may be configured to first implement and thus apply any policy contained in the broadcast indication 166 before applying less dynamic policy, such as ANDSF, at user equipment 114A.

In some example embodiments, broadcasted indication 166 may be specific to a cell, a tracking area, and the like. When this is the case, broadcast indication 166 may be adapted to control access based on the local availability of WLAN access networks in the vicinity of a given cell. For example, broadcast indication 166 sent by base station 110A may be specific to a user equipment in the coverage area of cell 112A, and if a given user equipment leaves cell 112A and enters another cell, the other cell is responsible for implementing steering control via another broadcast indication.

In some example embodiments, broadcast indication 166 is configured in a compact manner to keep the size of the broadcast indication to a relatively small size.

Figure 2:
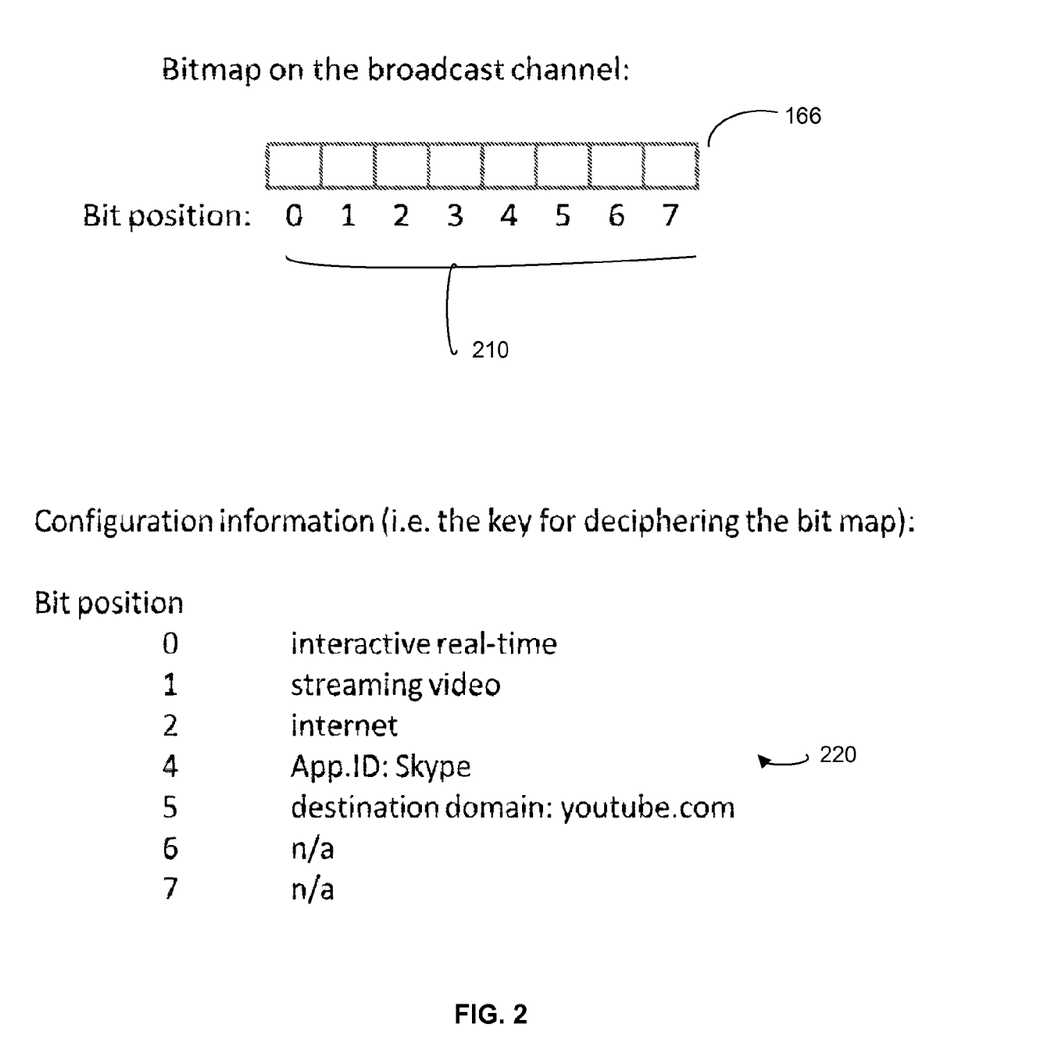
FIG. 2 depicts an example of an indication carried by a broadcast or other signaling mechanism to enable traffic steering, in accordance with some exemplary embodiments.

FIG. 2 depicts an example compact implementation of broadcast indication 166, in accordance with some example embodiments. In the example, of FIG. 2, the broadcasted indication 166 is coded as a multi-bit message, wherein each bit indicates whether certain services, certain applications, certain destination domains, and/or certain traffic types are allowed, preferred, and/or denied in an access network. For example, bit position 0 166 may represent interactive real-time traffic; bit position 1 may indicate streaming video; bit position 2 may represent internet traffic; bit position 4 may represent a specific application (for example, a voice over Internet Protocol application or other type of application); bit position 5 may indicate a certain destination domain; and so forth. To illustrate further, if broadcast indication 166 has the value 01000000, then bit position 1 indicates a preference or allowance for streaming video to be carried on cellular access network 112A. Because the network recognizes the importance, traffic load, congestion, and/or other network conditions associated certain services, applications, destination domains, and/or traffic types, the network may thus control access to cellular access network 112A and/or non-cellular access networks 112B-C via the broadcast indication 166 by changing the content information 210 (for example, by changing the values of the bits in the message 166) of broadcast indication 166.

In some example embodiments, the content information 210 provided by broadcast indication 166 may be specific to a location, such as for example a Tracking Area and the like. When this is the case, when a user equipment leaves a specific location, the user equipment may no longer apply the content information 210 provided by broadcast indication 166. Furthermore, when in the new location, the network may provide another broadcast indication configured for the new location and/or new network(s).

In some implementations, when the user equipment moves to another cell which does not broadcast a preference indication (such as message 166), the user equipment may be configured to presume that the other cell has no preferences, in which case the user equipment may rely on less dynamic policies, such as ANDSF policies and the like.

Although FIG. 2 depicts an example of format for the content information 210, other formats may be used to map to operating systems, application types, service types, domain types, and/or the like (an example of a notation scheme to identify applications and the like is illustrated in 3GPP TS 24.312 V11.6.0 (2013-03); Technical Specification; 3rd Generation Partnership Project; Technical Specification Group Core Network and Terminals; Access Network Discovery and Selection Function (ANDSF) Management Object (MO), (Release 11)). Rather than a bit map, the content information 210 may also contain the specific names/identities of the operating systems, application types, service types, domain types, and/or the like.

In some example embodiments, the content information 210 may indicate a signaling bearer (for example, a signaling radio bearer (SRB)), a data bearer (for example, an access stratum (AS and/or network access stratum (NAS) bearer), a logical channel, a logical channel group, a traffic type (for example, background or non-background traffic), specific quality of service (QoS) or QoS class identifier (QCI), and/or the like.

In some example embodiments, user equipment may be configured with information, such as for example a key to decode the meaning of the content information 210. For example, the key may map bit positions to a corresponding allowed/preferred application, service, domain, and the like, as depicted at FIG. 2 at 220. To illustrate further, if the dynamically broadcast indication 166 was coded as a 16 bit, then the content information 210 may further provide the mapping for the 16 bits to corresponding applications, services, traffic types, and the like.

In some example embodiments, the broadcast indication 166 may, as noted above, be dynamic in the sense that the information conveyed by the indication 166 may adapt to the condition of the cell where the indication 166 is broadcast. For example, when cell 112A is lightly loaded, the network including for example base station 110A may send broadcast indication 166 to signal that most (if not all) of the applications, services, destinations, and/or the like are preferred/allowed in cell 112A. However, when the traffic load at cell 112A increases, the network may send broadcast indication 166 to signal that some applications (for example, less critical applications, less time sensitive, and the like) are not preferred or not-allowed. Moreover, when cell 112A becomes heavily loaded, the network may send broadcast indication 166 to signal further limits to the traffic on the cell 112A (for example, restrict traffic at cell 112A to very specific applications, traffic types, and/or the like, such as for example delay sensitive voice call traffic, high priority traffic, and the like). As this previous example illustrates, the network may dynamically control, based on network conditions, a user equipment to steer between cellular cell 112A and non-cellular WLAN 112B.

In some example embodiments, key information 220 may be specified in a standard, sent to the user equipment via a broadcast channel, sent to the user equipment via other signaling (for example Open Mobile Alliance (OMA) Device Management signaling), and/or sent to the user equipment via NAS information (when for example the user equipment makes an initial attach to a network and/or when the user equipment makes the location update provided that updated information is available). The key information may also be sent to the user equipment as a configuration contained in a short message service (SMS) message and/or sent in other ways. To illustrate further, broadcast indication 166 may, in some example embodiments, indicate what key, such as key mapping information 220, is to be used to decode the broadcast indication 166 and coding logic. For example, the broadcast indication may explicitly include the key or provide an indication of what key can be used to decode the bit map.

In some example embodiments, content information 210 provided by broadcast indication 166 may be specific to a given operator of a public land mobile network.

In some example embodiments, if the user equipment did not have the configuration information, the user equipment may simply ignore the broadcasted information. For example, if the user equipment has not received the configuration information about the services/applications/traffic types and the like via signaling (in which case the user equipment may not be able to use the key to map the preferred/allowed services/applications/traffic types, and the like), the user equipment may ignore the broadcasted message 166 and instead use other, more static policy configurations, such as from ANDSF.

In some example embodiments, rather than expressly include an indication of the allowed/preferred application, service, traffic type, and the like, the configuration information may instead contain threshold values for specific applications or services or types of traffic. For example, network loading information may be broadcast, and the user equipment may adapt its behavior per the configuration information containing the threshold values. To illustrate further, there may be, in the configuration information, a threshold value for internet traffic, so that internet traffic is allowed in cell 112A only if the cell traffic load is lower than a given threshold value, such as 50%. When the network load information indicates a cell traffic load greater than 50%, the user equipment may in this example offload data for certain applications, services, or types of traffic from cell 112A/base station 110A to for example cell 112B/wireless local area network (WLAN) access point 110B. Furthermore, in some example embodiments, the provided threshold values may relate to an adjacent WLAN access point (AP) that may be further identified in the configuration information by a WLAN Service Set ID (SSID) or equivalent identifier. For example, a threshold value for voice traffic may be configured so that voice traffic is allowed in the WLAN access point only if the traffic load at the WLAN AP is lower than a value, such as 40%, and another threshold value mat be configured at the WLAN AP for internet traffic, so that internet traffic is allowed only in the WLAN AP if the traffic load at the WLAN AP is less than a value, such as 90%.

Although some of the examples herein describe base station 110A sending a broadcast indication 166 to signal preferences/allowances at cell 112A, other access points including WLAN access points 110B-C may send a broadcast indication as well for cell 112A as well as for other cells/access networks. For example, WLAN access point 110B may send a broadcast indication 166 to user equipment 114A and/or other user equipment to indicate whether certain services, certain applications, certain destination domains, and/or certain traffic types are allowed and/or preferred in cell 112A, cell 112B, and/or cell 112C. In another example, the WLAN access point 110B may send the broadcast information using a vendor specific element in the frame that is broadcasted by the access point.

Furthermore, although some of the examples disclosed herein describe the indication being broadcast by a base station, the content information 210 may be carried in other ways as well. For example, bit-mapped content information may, in some example, embodiments, be carried by dedicated signaling to the user equipment. In some example, embodiments, bit-mapped content information 210 may be made available simultaneously by broadcast via broadcast message 166 and dedicated signaling. When this is the case, the user equipment may be configured to pick which bit mapped content information to apply. For example, the user equipment may, in some example embodiments, be configured to use the bit-map information sent via dedicated signaling, rather than the broadcast message bit-map information (or vice versa).

Before providing additional examples, the following provides additional description regarding the system framework 100 in which some of the example embodiments described herein may be implemented.

In the example of FIG. 1, base stations 110A and 110D may be configured as an eNB base station serving macrocells 112A and 112D (also referred to herein as cells and coverage areas). The wireless access points 110B-C may be configured to serve wireless local area network or small cells 112B-C. For example, small cell 112B may be implemented as a picocell, a femtocell, and the like served by wireless access points 110B-C, examples of which include a picocell base station, a femtocell base station, a home base station, a WiFi access point, a WLAN access point, and a home E-UTRAN node B base station (HeNB) configured in accordance with standards, such as for example Third Generation Partnership Project (3GPP) Long Term Evolution (LTE). Although LTE is referred to herein, it is merely an example as other standards and technologies may be used as well. Moreover, when base stations 110A and 110D are implemented as an evolved Node B (eNB) type base station, as noted above, the base stations may be configured in accordance with standards, including the Long Term Evolution (LTE) standards, such as for example 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards).

In some exemplary embodiments, system 100 may include wireless access links. These access links may include downlinks for transmitting to user equipment and an uplink for transmitting from user equipment to a base station. The downlinks and uplinks may each comprise a modulated radio frequency carrying information, such as for example user data, control messages, radio resource control (RRC) messages, and the like. Moreover, access points 110A-D may include links, such as for example back haul links, to other networks (for example, other mobile networks, the Internet, and the like), network nodes, and the like.

In some example embodiments, the user equipment, such as for example user equipment 114A-B, may be implemented as a mobile device and/or a stationary device. The user equipment are often referred to as, for example, mobile stations, mobile units, subscriber stations, wireless terminals, tablets, smart phones, wireless devices, or the like. A user equipment may be implemented as, for example, a wireless handheld device, a wireless plug-in accessory, or the like. The user equipment may, in some example embodiments, be configured to operate in a heterogeneous network including small, non-cellular access networks (for example, WLAN or WiFi access networks at 112B-C) and cellular access networks (for example, 3GPP cells 112A and 112D). In some example embodiments configured as a heterogeneous network, user equipment may be configured as a multimode radio accessing cellular access networks via base station 110A and non-cellular access networks via access points 110B and the like.

Although FIG. 1 depicts four access points 110A-D, four cells 112A-D, and two user equipment 114A-B, system 100 may include other quantities and types of wireless access points, cells, and user equipment as well.

Figure 3:
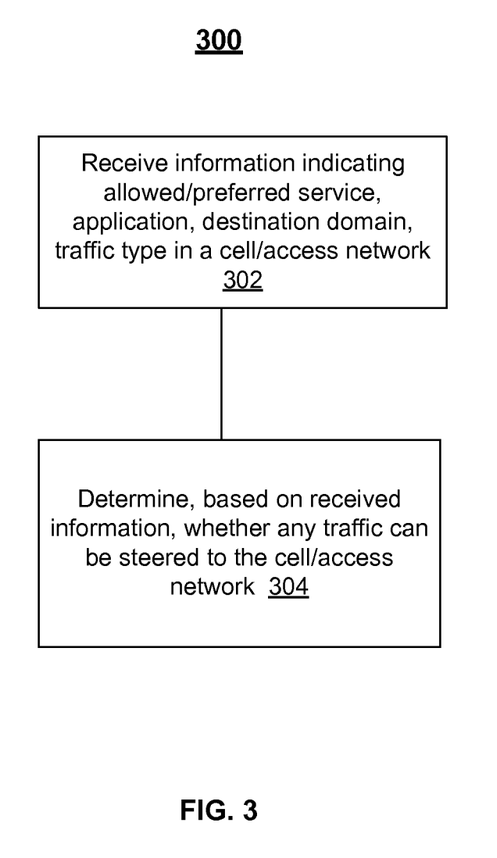
FIG. 3 depicts an example of a process configured for traffic steering, in accordance with some exemplary embodiments.

FIG. 3 depicts an example process 300 for providing to a user equipment an indication of whether an access network allows or prefers certain types of traffic, applications, destination domains, and/or services, in accordance with some example embodiments. The description of FIG. 3 also refers to FIGS. 1 and 2.

At 302, the user equipment may receive an indication of whether certain services, certain applications, certain destination domains, and/or certain traffic types are allowed and/or preferred in an access network. For example, a network including base station 110A may send, via a broadcast or via signaling, an indication 166 to one or more user equipment, such as user equipment 114A-B, in accordance with some example embodiments. This indication may provide information informing the user equipment 114A of which services, applications, destination domains, and/or traffic types are allowed and/or preferred in an access network, such as cell 112A. Moreover, the content 210 of the indication 166 may be adapted by the network as noted above to take into account changing network conditions. For example, as network conditions change at cell 112A, the indication may vary the types of applications, destination domains, and/or traffic allowed and/or preferred at cell 112A. To illustrate further, the broadcast message 166 may be sent by base station 110A to dynamically inform any user equipment entering the covered area of what types of traffic, services, are allowed at any given time on the radio access network/cell 112A.

At 304, the user equipment may determine, based on the information received at 302, whether any traffic can be steered to, or away from, an access network, in accordance with some example embodiments. For example, the indication 166 may indicate that only a certain type of application, such as a voice over internet protocol (VoIP) application, is allowed on cell 112A. In this example, user equipment 114A may steer the allowed VoIP application traffic to cell 112A, and other traffic would be routed to another access network, such as WLAN access network 112B. Furthermore, if the network adapts the content information 210 of the indication 166 to allow a different type of traffic, such as streaming video, user equipment 114A may then steer the allowed streaming video traffic to cell 112A, and other traffic would be routed to another access network, such as WLAN access network 112B. Furthermore, if user equipment 114A moves to another cell, such as cell 112D, the indication 166 may be configured to only be effective within cell 112A and thus not cell 112D. As such, the network including base station 110D would need to send another indication to signal allowed or preferred traffic on that cell 112D; otherwise the user equipment 114A may apply other policies, such as ANDSF and the like.

Figure 4:
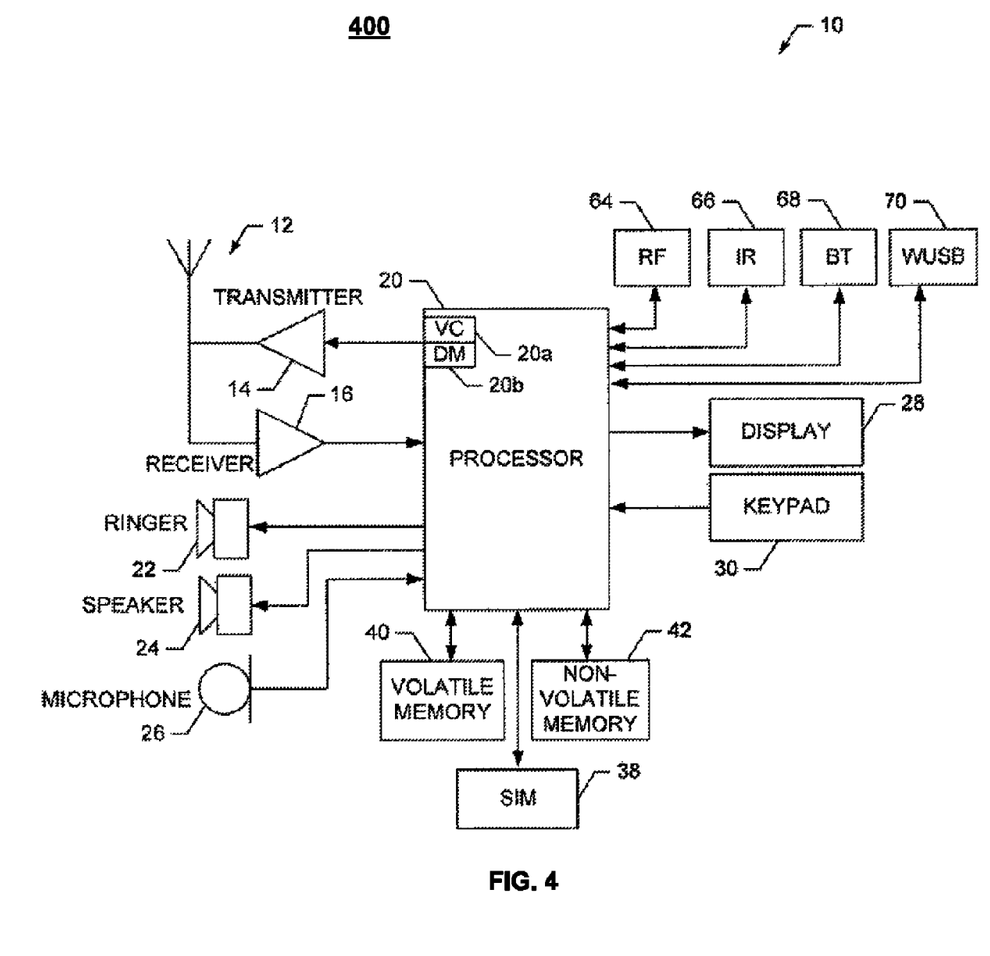
FIG. 4 depicts an example of a user equipment, in accordance with some exemplary embodiments.

FIG. 4 illustrates a block diagram of an apparatus 10, which can be configured as user equipment in accordance with some example embodiments.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example, a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example for example, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as for example for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example, LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example, a web browser. The connectivity program may allow the apparatus 10 to transmit and receive web content, such as for example, location-based content, according to a protocol, such as for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example, an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example, within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example, IEEE 802.11 techniques, IEEE 802.15 techniques, IEEE 802.16 techniques, and/or the like.

The apparatus 10 may comprise memory, such as for example, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as for example, an international mobile equipment identification (IMEI) code, capable of uniquely identifying apparatus 10. The functions may include one or more of the operations disclosed herein with respect to the user equipment, such as for example, the functions disclosed at process 300 (for example, receiving the indication 166, applying the indication 166, and routing traffic to a access network based on the applied indication, and/or the like). The memories may comprise an identifier, such as for example for example, an international mobile equipment identification (IMEI) code, capable of uniquely identifying apparatus 10. In the example embodiment, the processor 20 may be configured using computer code stored at memory 40 and/or 42 to enable, receiving indications 166, applying indications 166 to dynamic steer traffic to for example, a cellular radio access network or a WLAN, and routing traffic to a access network based on the applied indication, and/or the like as disclosed herein.

Figure 5:
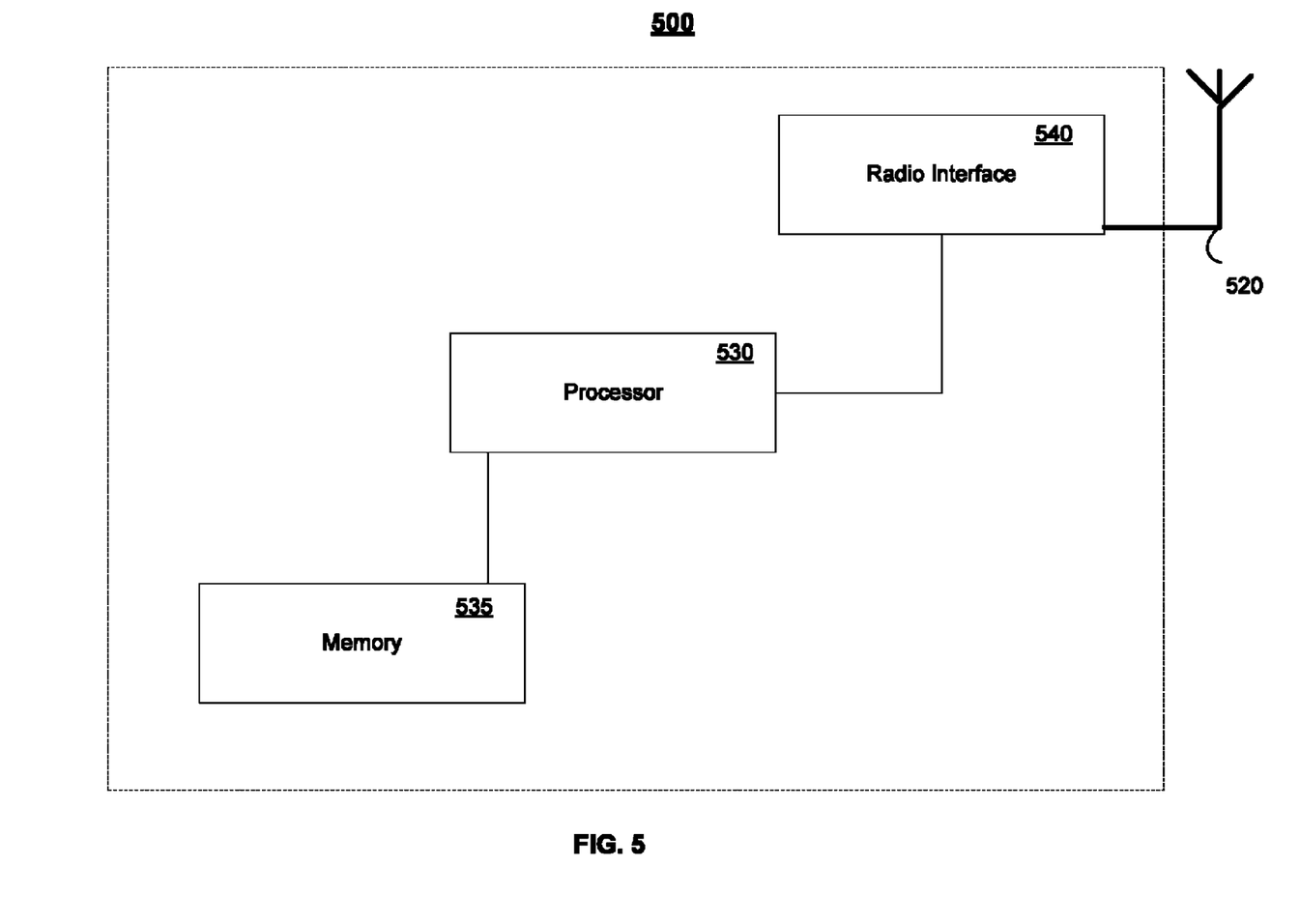
FIG. 5 depicts an example of a base station, in accordance with some exemplary embodiments.

FIG. 5 depicts an example implementation of a network node 500, such as for example base station 110A, access point 110B, and the like. The network node 500 may include one or more antennas 520 configured to transmit via a downlink and configured to receive uplinks via the antenna(s) 520. The network node 500 may further include a plurality of radio interfaces 540 coupled to the antenna 520. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technologies. The radio interface 540 may further include other components, such as for example filters, converters (for example, digital-to-analog converters and the like), mappers, a Fast Fourier Transform (FFT) module, and the like, to generate symbols for a transmission via one or more downlinks and to receive symbols (for example, via an uplink). The network node 500 may further include one or more processors, such as for example processor 530, for controlling the network node 500 and for accessing and executing program code stored in memory 535. In some example embodiments, memory 535 includes code, which when executed by at least one processor causes one or more of the operations described herein with respect to network node, such as for example a base station, access point, and the like. For example, network node 500 may send the indication 166 to one or more user equipment, adapt the content of the indication in order to dynamically steer traffic among access networks, and/or other operations associated with the network node, base station, or access points disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as for example, a computer or data processor circuitry, with examples depicted at FIGS. 4 and 5. A computer-readable medium may comprise a non-transitory computer-readable storage medium that may be any media that can contain or store the instructions for use by or in connection with an instruction execution system, apparatus, or device, such as for example, a computer. And, some of the embodiments disclosed herein include computer programs configured to cause methods as disclosed herein (see, for example, process 300 and/or the like).

Without in any way limiting the scope, interpretation, or application of the claims appearing below, a technical effect of one or more of the example embodiments disclosed herein is dynamic load balancing between access networks under the control of the network (for example, load balancing between a cellular access network and a non-cellular, WLAN access network).

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:

1. A method comprising:
   receiving, at a user equipment, a message provided by a base station serving a radio access network, wherein the base station is associated with a first tracking area, wherein the message includes an indication representative of a preference by the radio access network for traffic associated with at least one of an application, a destination domain, a service, and a traffic type, and wherein the preference is valid for the first tracking area but not a second tracking area;
   in response to the user equipment being located in the first tracking area, determining, based at least on the preference, whether to steer the traffic to at least one of the radio access network or a wireless local area network served by a wireless local area network access point; and
   in response to the user equipment being located in the second tracking area and the user equipment failing to receive another indication of another preference that is valid for the second tracking area, determining to steer the traffic based on a user preference and/or an access network discovery and selection function policy.

2. A method of claim 1, wherein the indication identifies a specific type of traffic preferred by the radio access network, wherein the specific type includes at least one of the application, the destination domain, the service, and the traffic type.

3. The method of claim 1, wherein the indication includes a threshold defining when the traffic is to be steered to at least one of the radio access network and the wireless local area network.

4. A method of claim 1, wherein the indication includes a bit-mapped indicator decoded using a key to identify a specific type of traffic preferred by the radio access network, wherein the specific type includes at least one of the application, the destination domain, the service, and the traffic type.

5. The method of claim 4, wherein the bit-mapped indicator is received via at least one of non-access stratum signaling, open mobile alliance device management, and short message service messaging.

6. A method of claim 1, further comprising:
applying, by the user equipment, a policy determined based on the preference, wherein the user equipment prioritizes the policy over another policy local to the user equipment, and wherein the other policy includes at least one of a user preference and an access network discovery and selection function policy.

7. A method of claim 1, wherein a content of the received indication changes as network conditions change.

8. A method of claim 1, further comprising:
receiving, at the user equipment, another message provided by another base station serving the radio access network, wherein the other base station is associated with the second tracking area, wherein the message includes another indication representative of another preference of the radio access network for traffic associated with the at least one of the application, the destination domain, the service, and the traffic type, and wherein the other preference is valid for the second tracking area; and
in response to the user equipment being located in the second tracking area instead of the first tracking area, determining, based at least on the other preference, whether to steer the traffic to at least one of the radio access network or the wireless local area network.

9. A method of claim 1, wherein the indication is received from the wireless local area network access point.

10. The method of claim 1, wherein the message comprises a broadcast message received over a signaling channel of the radio access network.

11. An apparatus, comprising:
at least one processor; and
at least one memory including computer program code, the at least one memory and the computer program code configured to, with the at least one processor, cause the apparatus to perform at least the following:
receive a message provided by a base station serving a radio access network, wherein the base station is associated with a first tracking area, wherein the message includes an indication representative of a preference by the radio access network for traffic associated with at least one of an application, a destination domain, a service, and a traffic type, and wherein the preference is valid for the first tracking area but not a second tracking area;
in response to the apparatus being located in the first tracking area, determine, based at least on the preference, whether to steer the traffic to at least one of the radio access network or a wireless local area network served by a wireless local area network access point; and
in response to the user equipment being located in the second tracking area and the user equipment failing to receive another indication of another preference that is valid for the second tracking area, determine to steer the traffic based on a user preference and/or an access network discovery and selection function policy.

12. An apparatus of claim 11, wherein the indication identifies a specific type of traffic preferred by the radio access network, wherein the specific type includes at least one of the application, the destination domain, the service, and the traffic type.

13. The apparatus of claim 11, wherein the indication includes a threshold defining when the traffic is to be steered to at least one of the radio access network and the wireless local area network.

14. An apparatus of claim 11, wherein the indication includes a bit-mapped indicator decoded using a key to identify a specific type of traffic preferred by the radio access network, wherein the specific type includes at least one of the application, the destination domain, the service, and the traffic type.

15. The apparatus of claim 14, wherein the bit-mapped indicator is received via at least one of non-access stratum signaling, open mobile alliance device management, and short message service messaging.

16. An apparatus of claim 11, wherein the apparatus is further caused to at least apply a policy determined based on the preference, wherein the apparatus prioritizes the policy over another policy local to the apparatus, wherein the other policy includes at least one of a user preference and an access network discovery and selection function policy.

17. An apparatus of claim 11, wherein a content of the received indication changes as network conditions change.

18. An apparatus of claim 11, wherein the apparatus is further caused to at least:
receive another message provided by another base station serving the radio access network, wherein the other base station is associated with the second tracking area, wherein the message includes another indication representative of another preference of the radio access network for traffic associated with the at least one of the application, the destination domain, the service, and the traffic type, and wherein the other preference is valid for the second tracking area; and
in response to the apparatus being located in the second tracking area instead of the first tracking area, determine, based at least on the other preference, whether to steer the traffic to at least one of the radio access network or the wireless local area network.

19. An apparatus of claim 11, wherein the indication is received from the wireless local area network access point.

* * * * *